US010879732B2

(12) United States Patent
Zeighami et al.

(10) Patent No.: US 10,879,732 B2
(45) Date of Patent: Dec. 29, 2020

(54) POWER SUPPLY MODE SELECTION

(71) Applicant: Microsoft Technology Licensing, LLC, Redmond, WA (US)

(72) Inventors: Roy Mehdi Zeighami, Fall City, WA (US); Michael Rees Helsel, Seattle, WA (US); Husam Atallah Alissa, Redmond, WA (US); Nicholas Andrew Keehn, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/957,675

(22) Filed: Apr. 19, 2018

(65) Prior Publication Data

US 2019/0326780 A1    Oct. 24, 2019

(51) Int. Cl.
*H02J 13/00* (2006.01)
*H02J 3/38* (2006.01)
*G05B 13/02* (2006.01)
*H04B 1/06* (2006.01)

(52) U.S. Cl.
CPC ............ *H02J 13/00* (2013.01); *G05B 13/027* (2013.01); *H02J 3/382* (2013.01); *H04B 1/06* (2013.01)

(58) Field of Classification Search
CPC .......... H02J 13/00; G05B 13/027; H04B 1/06
USPC ....................................................... 700/276
See application file for complete search history.

(56) References Cited

U.S. PATENT DOCUMENTS

| 2013/0232094 | A1* | 9/2013 | Anderson | .......... G05B 23/0229 706/12 |
| 2016/0011617 | A1* | 1/2016 | Liu | .......... G05B 15/02 700/287 |
| 2016/0011618 | A1* | 1/2016 | Janous | .......... G05B 15/02 700/291 |

* cited by examiner

*Primary Examiner* — Mohammad Ali
*Assistant Examiner* — Joshua T Sanders
(74) *Attorney, Agent, or Firm* — Buckley, Maschoff & Talwalkar LLC

(57) ABSTRACT

A system includes operation of a trained neural network to output a first signal indicative of one or more characteristics of a power signal based on an input plurality of power-related conditions data, determination of a first power supply mode based on the first signal, and control of a power supply to operate in the first power supply mode.

14 Claims, 7 Drawing Sheets

POWER SUPPLY MODE SELECTION

BACKGROUND

Conventional power supplies receive power from the electrical grid and deliver power to downstream electrical components. A power supply may apply electrical conditioning to the received power prior to delivering the power. If power is not being received from the electrical grid (e.g., during a local power failure) or if the received power is somehow unsuitable for downstream delivery (e.g., during a brownout), a power supply may opt to deliver power from a local battery to the downstream components.

A power supply may therefore provide several operational modes. According to a commonly-provided "active" mode, a power supply conditions incoming power and provides immediate battery availability if needed. This mode sacrifices efficiency due to power losses inherent to the power conditioning. A "bypass" mode allows incoming power to circumvent most of the power-conditioning circuitry of the power supply prior to output. A bypass mode is therefore more efficient than an active mode but risks damaging downstream components by providing low-quality or otherwise unsuitable power thereto.

In view of the foregoing, some power supplies provide a bypass mode in which the power is monitored and the supply is switched to an active mode if the power becomes unsuitable for output. This approach is considered risky due to its reliance on the accuracy and speed of detection electronics within the power supply. Accordingly, in many deployments, power supplies are configured to always operate in active mode. Improved power supply mode control is desired, to provide a better balance of efficiency and component safety than that which is currently available.

DETAILED DESCRIPTION

The following description is provided to enable any person in the art to make and use the described embodiments. Various modifications, however, will remain readily-apparent to those in the art.

Generally, some embodiments provide selection of an operational mode of a power supply based on a predicted characterization of the power incoming to the power supply. The prediction may be based on many factors and may be performed by a trained neural network. The neural network may be trained based on historical data which associates values of input parameters at given time periods with incoming power characteristics at those time periods. The parameters may include, but are not limited to, weather-related parameters, electrical grid-related parameters, and calendar-related parameters.

According to some embodiments, the selection of the operational mode is also based on factors which are less- or unrelated to the condition of the incoming power. These factors may include battery level, current load on supplied components, and desired output power specifications. The output power specifications may be associated with service level agreements for supplied power, criticality of the powered systems, etc.

Some embodiments therefore provide a technical solution to the technical problem of improving overall power supply efficiency while providing suitable output power to downstream electrical components.

Figure 1:
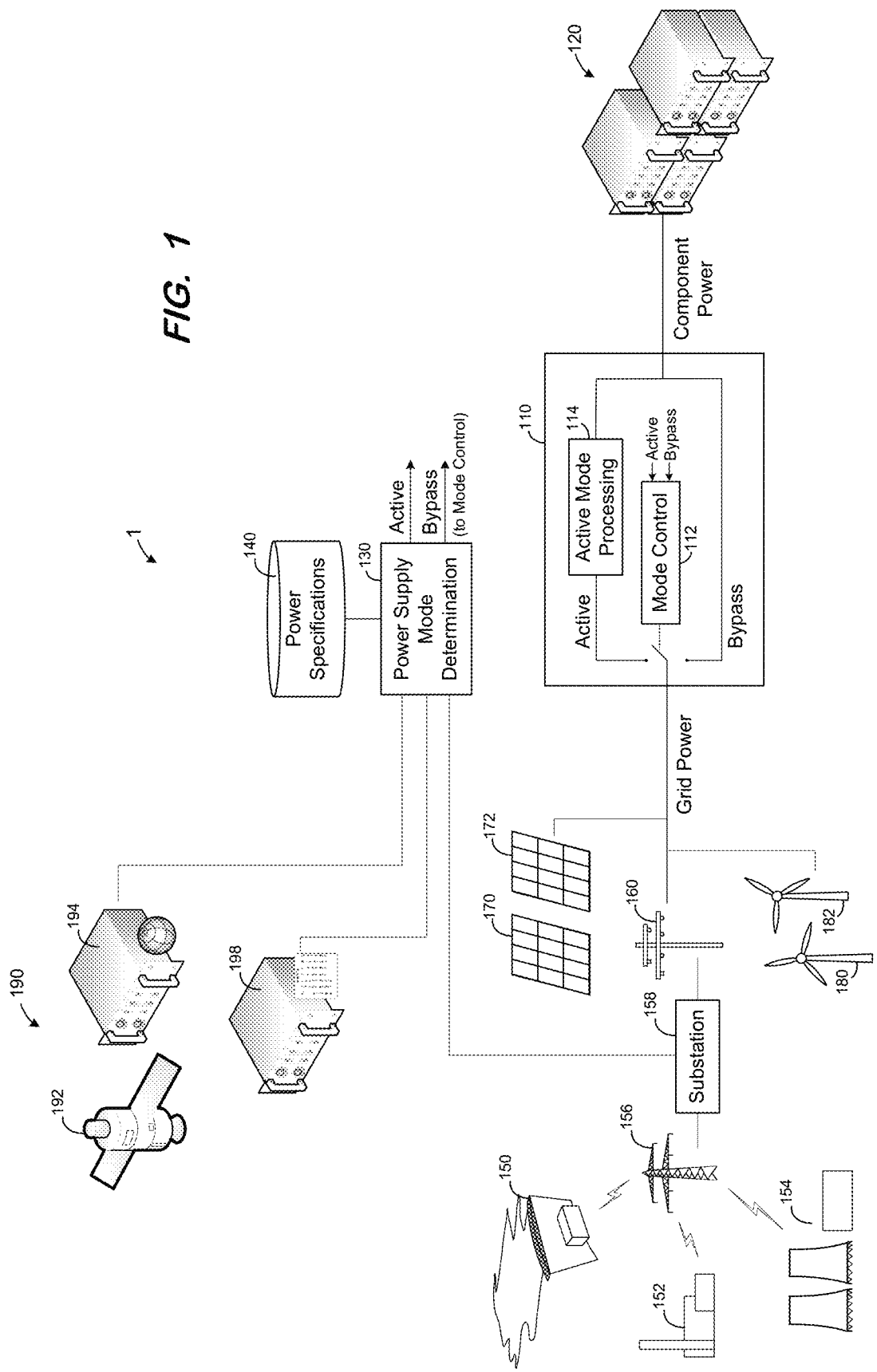
FIG. 1 illustrates a system architecture to control a power supply mode according to some embodiments.

FIG. 1 illustrates system architecture 1 according to some embodiments. System architecture 1 depicts various elements of operation according to some embodiments, and embodiments are not limited thereto.

Power supply 110 is configured to deliver power (referred to herein as "component power") to electrical components 120. Electrical components 120 may comprise any number and type of components, including a computer server, a datacenter comprising a plurality of computer servers, another power supply which in turn delivers power to other downstream electrical components, etc. According to some embodiments, the component power output by power supply 110 is intended to meet certain power specifications. These specifications may include voltage and current levels as well as quality-related specifications such as limits on voltage and/or current fluctuations, noise limits, and availability guarantees.

Power supply 110 includes mode control circuitry 112 to switch between two or more operational modes. For example, an active mode may apply active mode processing circuitry 114 to input incoming power to ensure that the output component power meets its associated specifications. In a bypass mode, the incoming power may pass to the output of power supply 110 with little or no electrical processing or conditioning. In some embodiments, active mode operation results in greater power losses than bypass mode operation.

Mode control circuitry 112 may select active mode or bypass mode based on input from power supply mode determination unit 130. In the illustrated embodiment, power supply mode determination unit 130 outputs a signal on either its Active output or its Bypass output to indicate a mode to mode control circuitry 112. Embodiments may implement other signaling protocols, involving one, two or more signal lines, for indicating a mode to mode control 112.

Determination unit 130 may determine an operational mode based on any number of inputs. The inputs may include pre-stored power specifications 140, which may include power specifications as described above. Power specifications 140 may differ for different components supplied by power supply 110 and/or for different customers operating components supplied by power supply 110. Power specifications 140 may also include power specifications for more than one power supply. In such embodiments, power supply mode determination unit 150 may determine and indicate a mode for more than one power supply.

Other inputs to determination unit 130 may include information related to the input power received by power supply 110. According to system architecture 1, the incoming power is grid power supplied by the local electrical grid. Generally, high-voltage power is produced by generating stations (e.g., hydro-electric plant 150, power plant 152, nuclear plant 154) and delivered to high voltage transmission tower 156. Substation 158 receives the high-voltage power and steps down the voltage for transmission via transmission tower 160. Power supply 110 receives the stepped-down power from transmission tower 160.

System architecture 1 includes, for example, renewable energy sources 170, 172, 180 and 182 coupled to the electrical grid. Sources 170 and 172 convert solar energy to electrical energy, while sources 180 and 182 convert wind energy to electrical energy. Renewable energy sources 170, 172, 180 and 182 may provide power back to the electrical grid and may therefore improve the stability and consistency of the grid power. Embodiments may include any type and number of renewable energy sources.

Power supply mode determination unit 130 may receive information related to the electrical grid from substation 158. Power supply mode determination unit 130 may use this information to assist the determination of power supply operational mode. This information may include but is not limited to grid status, upcoming grid activity, anticipated loads, and the status and availability of renewable energy sources.

The determination of power supply operational mode may also be based on weather-related and societal event-related information according to some embodiments. In this regard, system architecture 190 includes weather satellite 192 and weather forecasting server 194. Determination unit 130 may receive information related to current and forecasted weather from satellite 192, forecasting server 194 and/or any other source, including the World Wide Web. The information may include current and forecasted temperature, humidity, barometric pressure, wind speed, precipitation, etc. Event server 198 may provide determination unit 130 with information related to events which may affect the grid power of the electrical grid. Such events may include popular sporting events, elections, etc.

According to some embodiments, mode control circuitry 112 may also or alternatively receive one or more of the inputs received by determination unit 130 and use the inputs, in addition to the indication received from determination unit 130, to inform its selection of an operational mode.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system. Moreover, power supply mode determination unit 130 may comprise hardware and software to implement algorithms generated via neural network training as described below. Determination unit 130 may also comprise hardware and software specifically-intended for configuring, implementing and training such neural networks.

Figure 2:
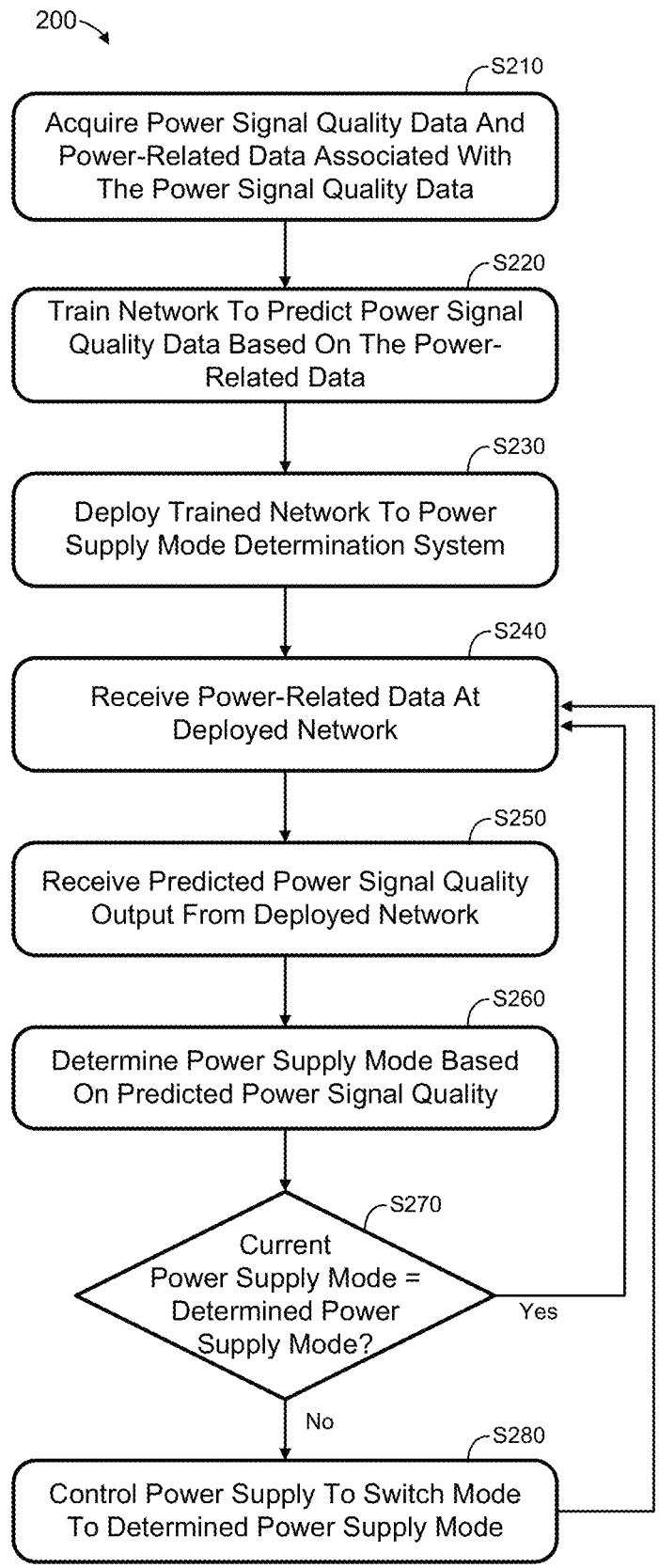
FIG. 2 is a flow diagram of a process to control a power supply mode according to some embodiments.

FIG. 2 is a flow diagram of process 200 according to some embodiments. Process 200 and the other processes described herein may be performed using any suitable combination of hardware, software or manual means. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Data is initially acquired at S210. The data will be used as described below to train a neural network.

The data acquired at S210 includes power signal quality data and power-related conditions data associated with the power signal quality data. For example, the acquired data may indicate characteristics (e.g., voltage, current, noise, max/min, fluctuations) of power received from an electrical grid over a time period, and values of various parameters which may be related to the power available on the grid over the same time period.

Figure 3:
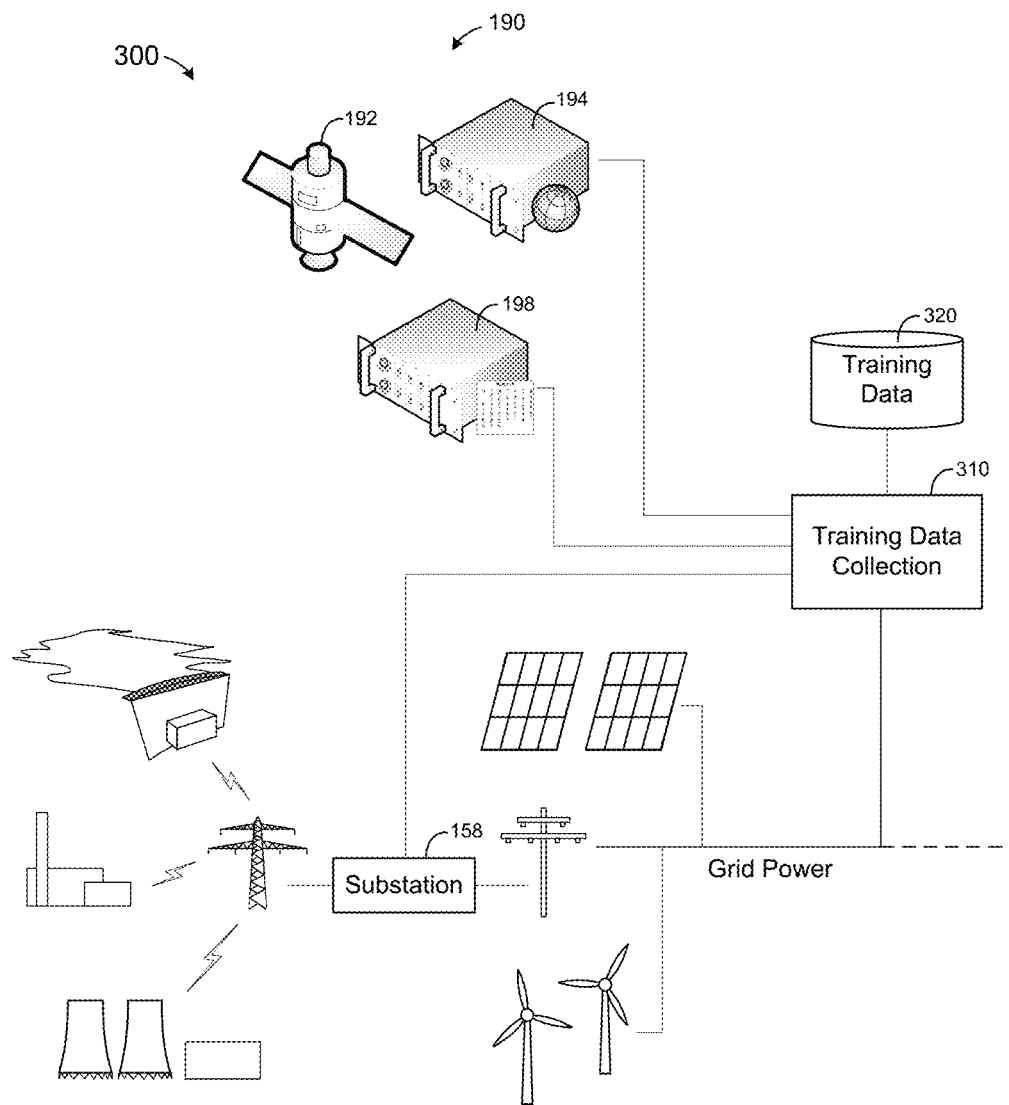
FIG. 3 illustrates acquisition of training data according to some embodiments.

FIG. 3 illustrates data acquisition architecture 300 according to some embodiments. As shown, training data collection unit 310 monitors grid power to acquire the power signal quality data. Training data collection unit 310 may also receive power-related conditions data from substation 158. As mentioned above, this conditions data may include, but is not limited to, grid status, upcoming grid activity, anticipated loads, and the status and availability of renewable energy sources. As also mentioned above, training data collection unit 310 may also receive current and forecasted temperature, humidity, barometric pressure, wind speed, and precipitation from satellite 192 and/or forecasting server 194, and power-related societal event information from event server 198.

The data acquired at S210 may therefore represent how changes to the power-related conditions may relate to changes in the quality and/or other characteristics of power received from the electrical grid. Training data collection unit 310 associates the received power-related conditions data with the received power quality data (e.g., based on time) and stores the associated data in training data storage 320.

In some embodiments, the received power quality data is characterized as, e.g., "Good" (i.e., suitable for use in bypass mode) or "Not Good" (i.e., should be subjected to active mode processing). Accordingly, each set of acquired power-related conditions data corresponding to a given time or time period may be annotated as "Good" ("Bypass") or Not Good" ("Active") depending on the power signal quality data associated with the time or time period.

Next, at S220, a network is trained to predict power signal quality data based on the acquired power-related conditions data. In a case that the training data has been annotated as Active or Bypass as described above, the network may comprise a classifier network to output a classification (i.e., Active or Bypass) based on a plurality of inputs as is known in the art. Embodiments may implement more than two classifications of power signal quality. Embodiments may also implement any trainable network design that is or becomes known.

According to some embodiments of S220, power signal quality data generated by the network based on power-related inputs is compared with "ground truth" power signal quality data which actually corresponds to the inputs, as indicated in the acquired training data. The network is modified based on the results of the comparison, and the process continues iteratively until the comparison is suitably favorable.

Figure 4:
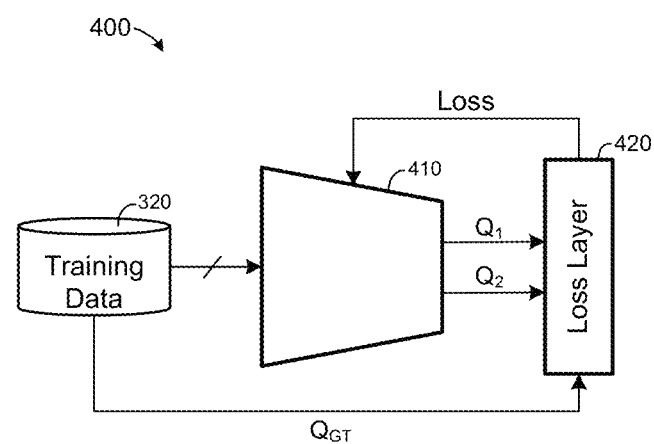
FIG. 4 illustrates network training according to some embodiments.

FIG. 4 illustrates architecture 400 for training a network 410 at S220 according to some embodiments. Network 410 is designed to receive a set of power-related conditions inputs and output a classification of power signal quality. In the illustrated example, the classification may be one of two classes, $Q_1$ and $Q_2$. Embodiments are not limited to two classifications or to classifications in general. For example, network 410 may output a single parameter whose value is indicative of power signal quality.

Training of network 410 involves determining a loss based on the output of network 410 and iteratively modifying network 410 based on the loss until the loss reaches an acceptable level or training otherwise terminates. In some embodiments, network 410 receives power-related conditions data from training data 320 as described above. Network 410 generates a classification (e.g., $Q_1$ and $Q_2$) for each set of power-related data. Loss layer component 420 determines a loss by comparing the generated classifications to the "ground truth" classification $Q_{GT}$ associated with each set of power-related conditions data.

The determined loss is back-propagated to network 410 and used to modify network 410 as is known in the art. The modification may comprise modification of weights associated with internal nodes of network 410. The loss may comprise an L1 loss, and L2 loss, or any other suitable measure of total loss. The process then repeats until the total loss is acceptable, at which point network 410 is considered trained.

The trained network is deployed to a power supply mode determination system at S230. Deployment of the trained network may comprise exporting the network structure and parameter values to a computing system, which will thereby allow that computing system to execute the algorithms which were generated during the training process. The computing system may comprise software executing on general-purpose hardware, software executing on hardware optimized for deployment of neural network-trained algorithms, and/or dedicated hardware.

Figure 5:
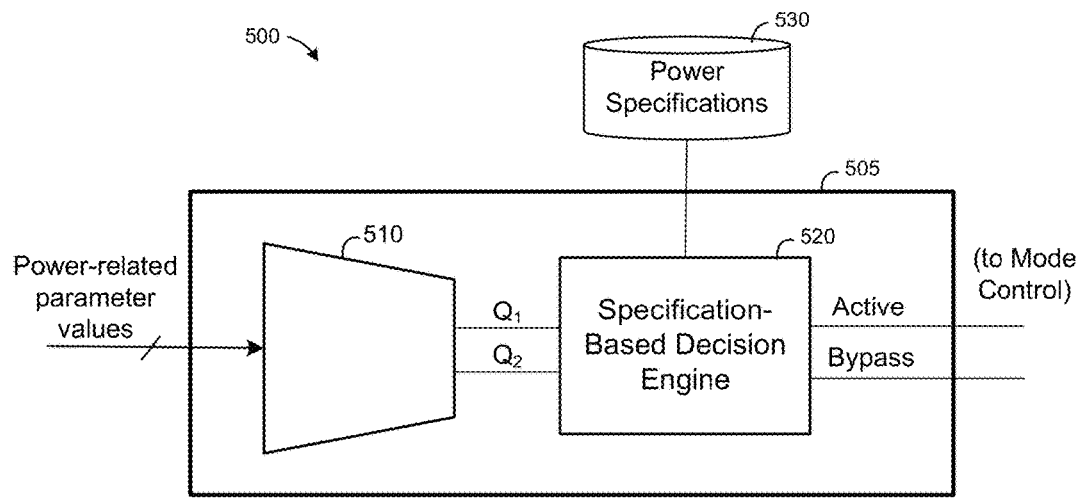
FIG. 5 is a block diagram of a power supply mode determination system according to some embodiments.

FIG. 5 illustrates deployment of a trained network in a power supply mode determination system according to some embodiments. Specifically, network 510 is configured to execute the algorithms which were trained into network 410 as described above. Configuration may comprise configuring network 510 with trained convolutional kernel parameter values.

Network 510 is deployed within power supply mode determination unit 505. Unit 505 also includes specification-based decision engine 520. Engine 520 receives a predicted power signal quality classification from network 510 and, based on the classification and information stored in power specifications 530, outputs an indication of a power supply mode. As described with respect to FIG. 1, power specifications 530 may allow engine 520 to determine a power supply mode based on customer requirements as well as the power signal quality predicted by network 510. In the illustrated example, two output lines are used to output indications of an active mode or a bypass mode, but embodiments are not limited to two output lines or to two power supply modes.

Power-related conditions data is received at the deployed network at S240. In one example, to which embodiments are not limited, the network is deployed in the same environment (i.e., with respect to the same local grid) as was used to collect the training data in S210. FIG. 1 illustrates such an environment and will be used to describe the subsequent steps of process 200.

For example, power supply mode determination unit 130 may be implemented by unit 505 of FIG. 5. Unit 505 receives values of power-related conditions at S240, which are input to network 510. The power-related conditions include those conditions which were used to train network 410, such as grid status, upcoming grid activity, anticipated loads, and the status and availability of renewable energy sources from substation 158, forecasted temperature, humidity, barometric pressure, wind speed, and precipitation from satellite 192 and/or forecasting server 194, and power-related societal event information from event server 198.

By virtue of its configuration, network 510 generates a predicted power signal quality based on the received conditions data. The predicted power signal quality is received at S250, for example by decision engine 520. Next, at S260, a power supply mode is determined based on the predicted power signal quality. In one example of S260, decision engine 520 determines a power supply mode based on the power signal quality predicted by network 510 and on power specifications which apply to the present deployment. For example, more-stringent power specifications may lead to a determination of Active mode in view of a given predicted power signal quality, while less-stringent power specifications may lead to a determination of Bypass mode in view of the same predicted power signal quality.

The determined power supply mode may be received by mode control unit 112 from determination unit 130. If the determined power supply mode is the same as the current operational mode of power supply 110, flow simply returns to S240 to collect additional power-related data and continues as described above. If the determined mode and the current mode are different, mode control unit 112 may control power supply 110 to switch to the determined operational mode. Flow then returns to S240 and continues as described above.

In some embodiments, additional training data may be acquired during operation. This training data may be added to prior training data and used to train a network to achieve improved power signal quality predictions.

According to the above example, engine 520 uses the predicted power signal quality and corresponding power specifications to determine a power supply mode. In some embodiments, the power supply mode determined by engine 520 is not dispositive, but is used as an input to a subsequent mode determination which also considers the status of available battery power within the power supply.

Figure 6:
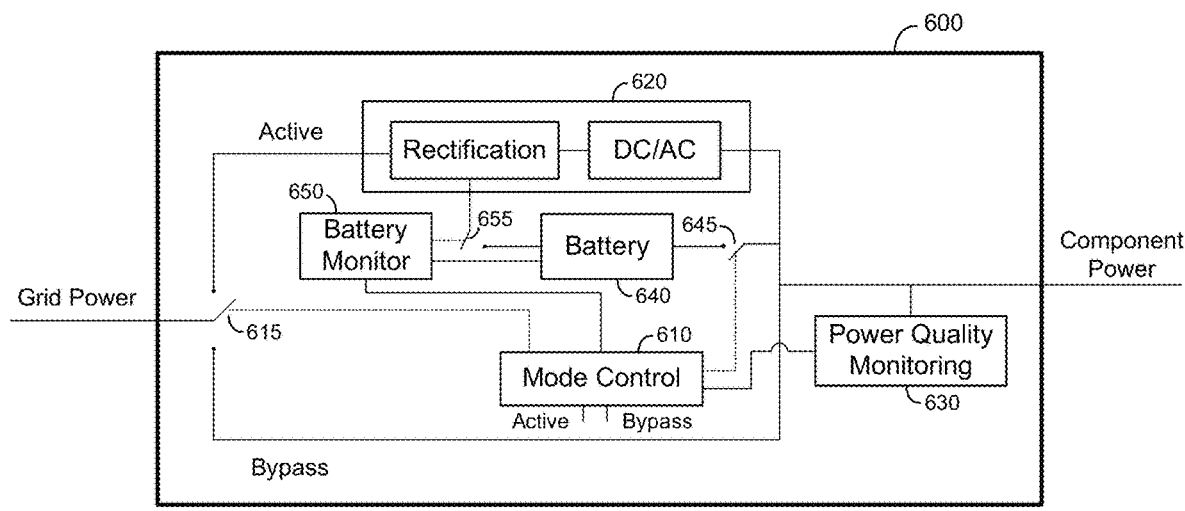
FIG. 6 is a block diagram of a power supply according to some embodiments.

FIG. 6 is a block diagram of a power supply according to some embodiments. Power supply 600 includes mode control unit 610, active processing circuitry 620 and an ability to switch between active and bypass mode as described above. Power supply 600 also includes power quality monitoring unit 630, battery 640 and battery monitor 650.

Mode control unit 610 receives output from a mode determination unit as described herein. Unit 610 also receives power quality monitoring information from power quality monitoring circuitry 630 as is known in the art. The power quality monitoring information may allow mode control unit 610 to determine an operating mode based not only on a predicted power signal quality but also on the actual quality of power received from the grid. For example, if mode determination unit 505 indicates that a bypass mode should be used, but power quality monitoring circuitry 630 indicates that the current power received from the grid is of unsuitable quality, mode control unit 610 may determine that power supply 600 should be operated in active mode.

Battery monitor 650 monitors a state of battery 640 and may control whether or not to charge the battery based on the monitored state. For example, battery monitor 650 closes switch 655 if battery 640 is not fully charged and opens switch 655 if battery 640 is fully charged. As shown, mode control unit 610 may select a battery-only power supply mode by opening switch 615 and closing switch 645.

Battery monitor 650 may also provide battery state information to mode control unit 610. Accordingly, mode control unit 610 may determine an operational mode based on the determination of mode determination unit 505, information from power quality monitoring circuitry 630, and battery state information. In one example, active mode is chosen (in order to charge battery 640 with rectified DC voltage) any time the battery charge falls below a particular level, regardless of the information received from mode determination unit 505 and power quality monitoring circuitry 630.

According to some embodiments, the determinations performed by network 510, engine 520 and mode control 610 may be performed by a single network. The single network may receive the above-described power-related inputs, power specifications, power quality monitoring information and battery status information, and may determine a power supply mode based thereon.

Figure 7:
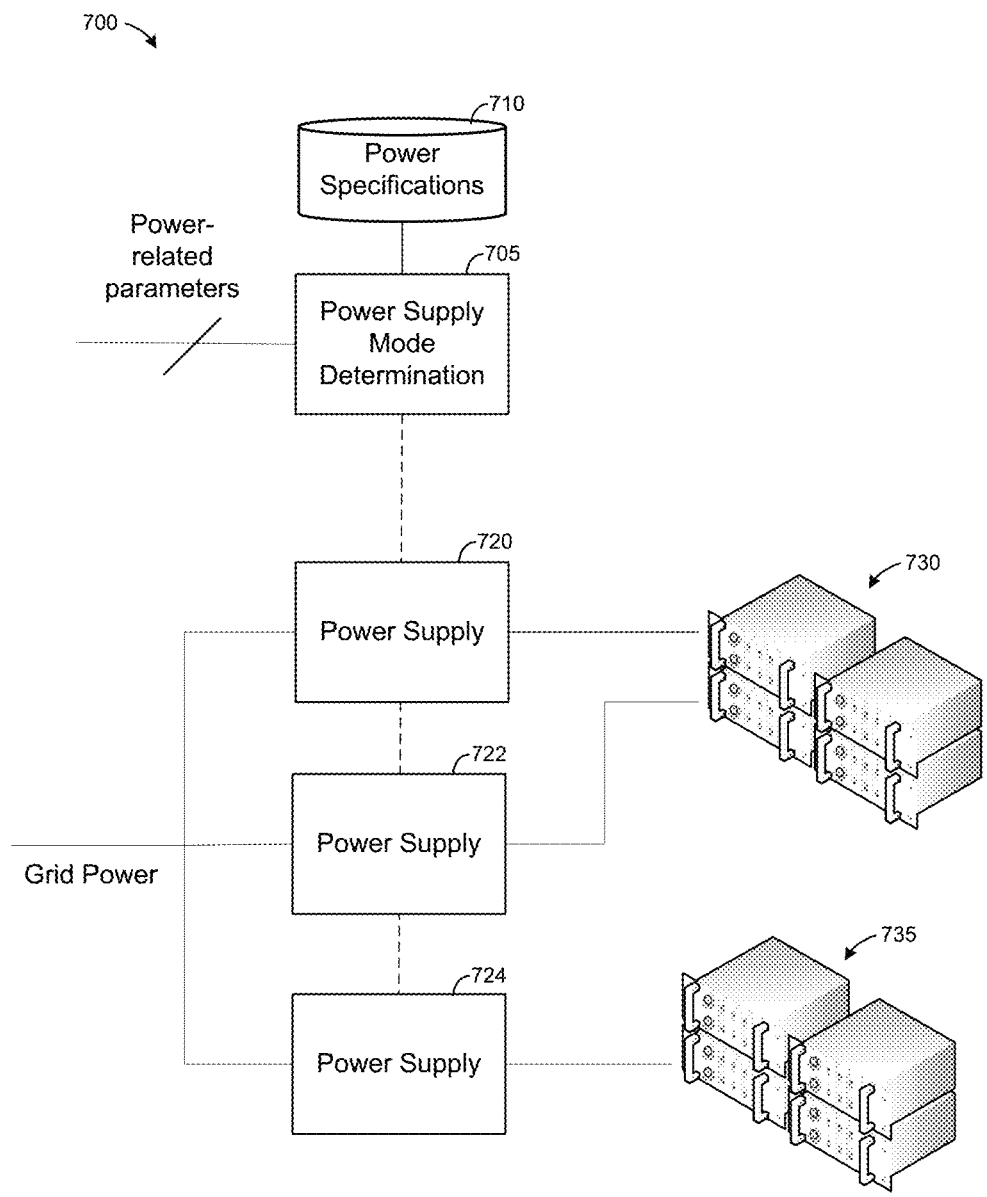
FIG. 7 illustrates a power distribution architecture with power supply mode control according to some embodiments.

Some embodiments may determine power supply modes for two or more power supplies. Moreover, each power supply for which a power supply mode is determined may be configured to provide power to a same or different set of downstream electrical components. For example, architecture 700 of FIG. 7 includes power supply mode determination unit 705 which includes a deployed trained network and receives power-related conditions data as described above. Based on the input values and on power specifications 710, power supply mode determination unit 705 determines power supply modes for each of power supplies 720, 722 and 724.

Each of power supplies 720, 722 and 724 receives the same power from a local electrical grid. The power-related conditions data received by unit 705 are related to power delivered by the same electrical grid. Power supplies 720 and 722 each provide power to components 730. Accordingly, the power specification used by power supply mode determination unit 705 to determine an operational mode for power supply 720 may be the same as the power specification used to determine an operational mode for power supply 722. In contrast, power supply 724 provides power to components 735 and therefore the power specification used to determine an operational mode for power supply 724 may be different from the power specification used to determine an operational mode for power supplies 720 and 722.

Figure 8:
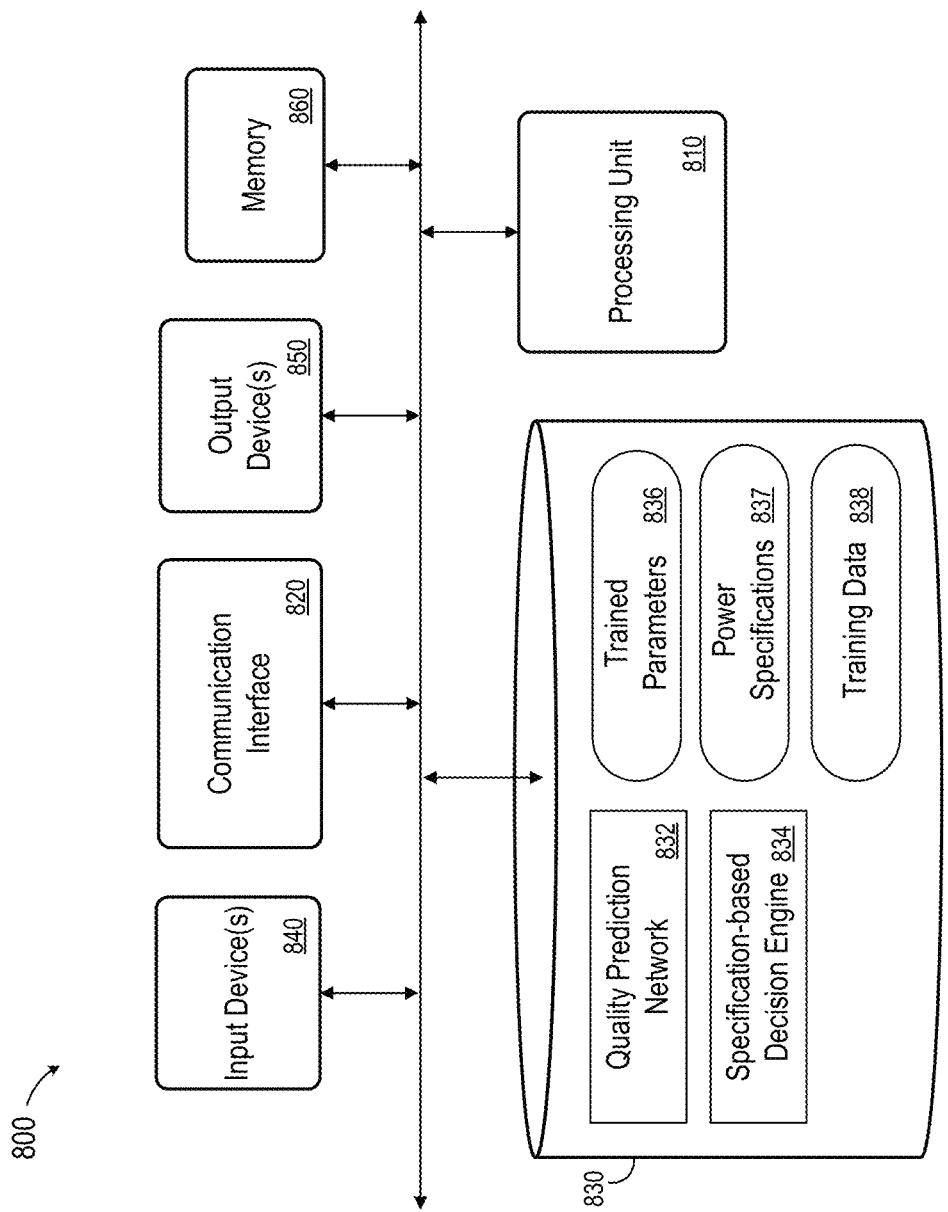
FIG. 8 is a block diagram of an apparatus according to some embodiments.

FIG. 8 is a block diagram of system 800 according to some embodiments. System 800 may comprise a general-purpose computer and may execute program code to perform any of the functions described herein. For example, system 800 may comprise an implementation of power supply mode determination unit 120 and/or 505 in some embodiments.

System 800 includes processing unit 810 operatively coupled to communication device 820, persistent data storage system 830, one or more input devices 840, one or more output devices 850 and volatile memory 860. Processing unit 810 may comprise one or more processors, processing cores, etc. for executing program code. Communication interface 820 may facilitate communication with external devices, such as devices providing power-related data as described herein. Input device(s) 840 may comprise, for example, a keyboard, a keypad, a mouse or other pointing device, a microphone, a touch screen, and/or an eye-tracking device. Output device(s) 850 may comprise, for example, a display (e.g., a display screen), a speaker, and/or a printer.

Data storage system 830 may comprise any number of appropriate persistent storage devices, including combinations of magnetic storage devices (e.g., magnetic tape, hard disk drives and flash memory), optical storage devices, Read Only Memory (ROM) devices, etc. Memory 860 may comprise Random Access Memory (RAM), Storage Class Memory (SCM) or any other fast-access memory.

Quality prediction network 834 and specification-based decision engine 834 may comprise program code executed by processing unit 810 to cause system 800 to predict power signal quality and to determine a power supply mode, respectively, as described herein. The code of quality prediction network 832 may utilize trained network parameters 836, while the code of engine 834 may reference power specifications 837. As described above, system 800 may also operate to collect training data 838 for future network training. Data storage device 830 may also store data and other program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. An apparatus comprising:
   a neural network to classify an input plurality of power-related conditions data into one of a plurality of classifications of power signal quality;
   a storage device to store a first power specification and a second power specification;
   a determination unit to determine a power supply power conditioning mode from a plurality of power supply power conditioning modes based on a stored power specification and a classification of power signal quality; and
   a control unit to control a power supply to operate in the first power supply power conditioning mode based on the determination by the determination unit,
   wherein a power supply power conditioning mode determined based on a first stored power specification and a first classification of power signal quality is different from a second power supply power conditioning mode determined based on a second stored power specification and the first classification of power signal quality.

2. An apparatus according to claim 1, wherein the plurality of power-related conditions data include an electrical grid load.

3. An apparatus according to claim 2, wherein the plurality of power-related conditions data include an availability of renewable power resources.

4. An apparatus according to claim 1,
   wherein the determination unit determines the power supply power conditioning mode based on the classification of power signal quality and on a stored power specification associated with an electrical component coupled to the power supply.

5. An apparatus according to claim 4, wherein the plurality of power-related conditions data include a weather condition and an electrical grid load.

6. A method comprising:
classifying, using a neural network, an input plurality of power-related conditions data into one of a plurality of classifications of power signal quality
identifying a first stored power specification;
determining a first power supply power conditioning mode from a plurality of power supply power conditioning modes based on the first stored power specification and the classified one of the plurality of classifications of power signal quality;
controlling a power supply to operate in the first power supply power conditioning mode;
classifying, using the neural network, an input second plurality of power-related conditions data into the one of a plurality of classifications of power signal quality;
identifying a second stored power specification;
determining a second power supply power conditioning mode from the plurality of power supply power conditioning modes based on the second stored power specification and the classified one of the plurality of classifications of power signal quality,
wherein the first power supply power conditioning mode determined is different from the second power supply power conditioning mode.

7. A method according to claim 6, wherein the plurality of power-related conditions data include a weather condition.

8. A method according to claim 7, wherein the plurality of power-related conditions data include an electrical grid load.

9. A method according to claim 8, wherein the plurality of power-related conditions data include an availability of renewable power resources.

10. A method according to claim 6,
wherein the first power specification associated with a first electrical component coupled to the power supply and the second power specification is associated with a second electrical component coupled to the power supply.

11. A method according to claim 10, wherein the plurality of power-related conditions data include a weather condition and an electrical grid load.

12. A method comprising:
acquiring power signal quality data and conditions data associated with power signal quality;
training, using the acquired power signal quality data and conditions data, a neural network to classify input conditions data into a first power signal quality classification of two or more power signal quality classifications;
receiving first conditions data at the trained neural network;
classifying, by the trained neural network, the first received conditions data into a first power signal quality classification;
determining a first power supply power conditioning mode from a plurality of power supply power conditioning modes based on a first stored power specification and the first power signal quality classification;
controlling a power supply to operate in the first power supply power conditioning mode;
receiving second conditions data at the trained neural network;
classifying, by the trained neural network, the second received conditions data into the first power signal quality classification;
determining a second power supply power conditioning mode from the plurality of power supply power conditioning modes based on a second stored power specification and the first power signal quality classification; and
controlling the power supply to operate in the second power supply power conditioning mode,
wherein the first power supply power conditioning mode determined is different from the second power supply power conditioning mode.

13. A method according to claim 12, wherein the first stored power specification associated with a first electrical component coupled to the power supply and the second stored power specification associated with a second electrical component coupled to the power supply.

14. A method according to claim 13, wherein the received conditions data includes a weather condition and an electrical grid load.

* * * * *